United States Patent Office 3,124,460
Patented Mar. 10, 1964

3,124,460
ORGANOLEPTIC COMPOSITIONS
Charles Ward Erwin, 228 N. La Salle St., Chicago, Ill.
No Drawing. Filed Mar. 16, 1961, Ser. No. 96,105
5 Claims. (Cl. 99—1)

This invention relates to compositions and methods for eliminating, reducing or preventing the formation of unpleasant odors and tastes, and to food products containing said compositions.

I have found that many existing unpleasant odors may be eliminated or reduced by addition to the odoriferous material of a composition comprising water soluble ferrous and cupric compounds. Specifically, this composition includes ferrous iron and cupric copper in a ratio which may vary from 1000:1 to 1:10, preferably from 100:1 to 1:1. These ratios refer to the metal contents of the soluble compounds in my composition. Further, for most effective deodorizing effect, the ferrous iron and the copper are both present in two forms; as a water soluble ionizable salt and as a water soluble non-ionizable complex, specifically, a chelate. The water soluble ionizable salts may amount to from 10 to 90% of the total amount of iron and copper compounds, the remainder being the water soluble non-ionizable copper and iron complexes.

Among the ionizable cupric copper and ferrous iron salts that may be used are the sulfates, chlorides and acetates. Among the non-ionizable water soluble cupric copper and ferrous iron complexes that may be used are the gluconates, citrates, tartrates, the salts of ethylene diamine tetra acetic acid, and the sodium or potassium iron and copper chlorophyllins.

My deodorizing composition may be added to the material to be deodorized in amounts ranging from 1 to 100 parts per million of said material. The exact amount to be added will vary somewhat with the specific nature of said material. However, the amount to be added is easily determined, by noting the deodorizing effect of various amounts.

The use of my above deodorant composition is illustrated by the following experiment. Partially dried sewage sludge obtained at the Glen Ellyn, Illinois, sewage disposal plant was used in this study. The odor of the sludge samples was determined by placing 10 grams of sludge in a polyethylene bag, keeping the bag at 37° C. for 5 minutes and measuring the odor by means of an osmoscope (maximum reading 6). The value then obtained is referred to hereinbelow as total odor. Another 10 gram sludge sample was made into a slurry by being well mixed with 10 ml. water. The resulting slurry was placed in a large centrifuge tube and spun at about 3000 r.p.m. for 10 minutes. The supernatant liquid was poured into a polyethylene bag, held at 37° C., for 5 minutes and then the odor was determined with an osmoscope. The resulting value is referred to hereinbelow as the supernatant odor. The centrifugate (solid matter) was removed from the tube, placed in a polyethylene bag, held at 37° C. for 5 minutes and then the odor was determined with an osmoscope. The value then obtained is referred to hereinbelow as the solids odor.

The above three odor determinations were carried out on the raw sludge and on sludge containing the additions tabulated as follows:

| No. | Addition | in mg./kg. of sludge |
|---|---|---|
| 1 | Ferrous gluconate | 100 |
| 2 | Ferrous sulfate | 100 |
| 3 | Copper gluconate | 10 |
| 4 | Copper sulfate | 10 |
| 5 | Ferrous gluconate | 100 |
|   | Copper gluconate | 10 |
| 6 | Ferrous sulfate | 100 |
|   | Copper sulfate | 10 |
| 7 | Ferrous gluconate | 50 |
|   | Copper gluconate | 5 |
|   | Ferrous sulfate | 50 |
|   | Copper sulfate | 5 |
| 8 | Ferrous sulfate | 50 |
|   | Ferrous gluconate | 50 |
| 9 | Ferrous sulfate | 100 |
|   | Ferrous gluconate | 100 |
| 10 | Copper sulfate | 5 |
|   | Copper gluconate | 5 |
| 11 | Copper sulfate | 10 |
|   | Copper gluconate | 10 |

The odor values obtained are tabulated as follows:

| Addition | Odor | | |
|---|---|---|---|
|  | Total | Supernatant | Solids |
| Raw sludge | 6 | 6 | 6 |
| 1 | 6 | 6 | 6 |
| 2 | 6 | 6 | 6 |
| 3 | 6 | 6 | 6 |
| 4 | 6 | 6 | 6 |
| 5 | 4 | 3 | 5 |
| 6 | 3 | 5 | 2 |
| 7 | 2 | 2 | 2 |
| 8 | 6 | 6 | 6 |
| 9 | 6 | 6 | 6 |
| 10 | 6 | 6 | 6 |
| 11 | 6 | 6 | 6 |

The tabulated values clearly indicate the effectiveness of compositions containing both ferrous iron and cupric copper, as against compositions containing only one of these metals. The still greater effectiveness of compositions including both metals in both ionizable and non-ionizable form is also demonstrated. This greater effectiveness is probably due to absorption of copper and iron ions by the sludge solids, while the non-ionizable metal content of my composition is not so absorbed. Thus, the metal content of my composition is distributed throughout the odoriferous material. Note, however, that, at least at the level of additions tabulated, this greater effectiveness is obtained only when ferrous iron and copper are combined.

Some water or moisture should be present in the material to be deodorized by the use of my composition.

The above disclosed composition may also be used to eliminate, reduce or prevent the formation of various body odors in mamals such as humans and dogs. For this purpose, the composition is of course made up of edible compounds. The specific ferrous iron and cupric copper compounds mentioned above by way of examples are edible and may be used.

There are various unpleasant body odors generated by mamals. These body odors include what may be called body odors proper which emanate from the skin and the hair and which are often due to perspiration (in those mammals which secrete perspiration); breath odors, which are due, in part, to materials adhering to the teeth, tongue and gums (which odors may be referred to as mouth odors) and, in part, to odors released in the lungs, as on the ingestion of odoriferous materials (such as onions and garlic) which are absorbed through the lining of the gastrointestinal tract and carried in the blood stream to the lungs; fecal and flatulence odors; and urine odors.

Some of these odors are hereinafter referred to as systemic odors. With this term I designate odors due to odoriferous substances carried in the blood stream. These systemic odors appear in the body odor, particularly in the body odors of animals secreting perspiration; in the urine odor; and in the breath odor, in particular that part of the breath odor which may be referred to as lung odor, since it originates in the lung.

As noted hereinabove, these systemic odors are due to odoriferous substances carried in the blood stream. These odoriferous substances, as noted hereinabove, may be ingested with food and thus introduced into the blood stream. Other odoriferous substances, e.g., indole and skatole, are generated in the lower intestine by putrefaction of proteins and, by absorption through the intestinal wall, introduced into the blood stream.

Other body odors are herein referred to as local body odors. These include the above noted mouth odors due to putrefaction of food material lodged on the teeth, tongue and gums and also fecal and flatulence odors due to putrefactive decomposition of proteins in the lower intestine.

My above disclosed deodorant composition when incorporated with a food which is ingested by a mammal, eliminates, prevents or reduces both systemic and local body odors.

The food composition of the present invention includes from 1 to 100 parts per million of ferrous iron and from 0.1 to 10 (preferably 5 and not more than 7) parts per million of cupric copper. Preferably, the ratio of iron to copper is from 1:1 to 50:1 or 100:1. I have found that there is a synergistic effect between ferrous iron and cupric copper in these ratios, with respect to elimination, prevention and reduction of body odors.

The nature of the above noted body odor inhibition is illustrated by the following experiment.

Three groups of three mice each were kept in separate cages and fed Rockland small animal food, ground, for one week. The cages were provided with fine screen floors so that the feces could not drop through the floor. A circle of filter paper was kept in a pan below the floor of each cage. The feces were removed each day and the paper circles were changed each day. After one week, the odor of the mice, the feces and the paper circles which trapped the urine was measured as follows:

The odor of the whole mouse was measured by placing each individual mouse in a plastic bag for three minutes at room temperature. The odor in the bag was then evaluated with an osmoscope graduated to distinguish six odor levels indicated as 1, 2, 3, 4, 5 and 6, in order of ascending odor levels.

The fecal odor was determined by placing twenty-five feces pellets in a large test tube which was capped and allowed to stand in an incubator at 37° C., for five minutes. The odor level was then determined with an osmoscope.

The urine odor was determined by removing the circle of paper from the pan below the cage and placed in a plastic bag which was closed and placed in the incubator for five minutes. The odor level was then determined with an osmoscope.

The groups of mice were then fed with a diet of ground Rockland food supplemented as indicated in the following table:

| Group | Supplement per pound of food | Mg. |
|---|---|---|
| 1 | Ferrous ammonium sulfate | 10 |
|   | Copper sulfate | 0.55 |
|   | Ferrous gluconate | 12.05 |
|   | Copper gluconate | 1.0 |
| 2 | No supplement | ---- |
| 3 | Ferrous gluconate | 12.05 |
|   | Ferrous ammonium sulfate | 10 |
|   | Copper sulfate | 0.55 |
|   | Copper gluconate | 1.0 |

After five days of supplemented diet, the odor levels of the mice were again determined, and the same was done after another week on the supplemented diet. The original odor levels, those after five days, and those after a further week (indicated as 1, 2 and 3) are shown in the following table. The numbers tabulated are the average of the three mice in each group.

| Group | Odor Levels | | | | | | | | |
|---|---|---|---|---|---|---|---|---|---|
|   | Total Mouse | | | Fecal | | | Urine | | |
|   | 1 | 2 | 3 | 1 | 2 | 3 | 1 | 2 | 3 |
| 1 | 6 | 3 | 3 | 6 | 4 | 4 | 6 | 1 | 1 |
| 2 | 6 | 6 | 6 | 6 | 6 | 6 | 6 | 6 | 6 |
| 3 | 6 | 4 | 3 | 6 | 4 | 4 | 6 | 2 | 1 |

The Rockland rat or small animal food mentioned above is a standard food containing soybean oil meal, cane mollasses, fish meal, condensed buttermilk, corn gluten meal, irradiated brewers' type yeast, 4 oz. per ton wheat germ oil, o.p. linseed oil meal, corn oil meal, ground oats, wheat bran, wheat flour midds, ground yellow corn, ground hulled barley, ground hulled oats, ground whole wheat, whole milk powder, alfalfa leaf meal, vitamin A oil, ½% steamed bone meal, 1% calcium carbonate from limestone, and 2% salt. This food contains at least 21% crude protein, at least 4% crude fat, not more than 6% crude fiber, and 5,000 U.S.P. units vitamin A per pound.

The combination of groups 1 and 3 has been tested, with excellent results, on dogs, cats and humans. For humans, the supplement was mixed with oat meal; for cats, with fish which was thereafter canned; and for dogs, with horse meat, which was thereafter canned.

The deodorizing food supplement of the present invention, when added to smelly goods, for instance, canned fish, or canned horse meat flavored with garlic, greatly reduces the smell of such food.

I claim:

1. A food composition containing water soluble compounds of ferrous iron and cupric copper in a ratio of from about 1000:1 to about 1:10 of metallic iron content to metallic copper content, a part of each of said metals being present in the form of an edible water-soluble ionizable salt, the remainder of each being present in the form of an edible water-soluble non-ionizable chelate, said metals in the form of salt making up from about 10 to about 90 percent of the total amount of said metals, the amount of copper being from 0.1 to less than 10 parts per million of said food composition.

2. A composition according to claim 1 containing said metals in a ratio of iron to copper ranging from about 5:1 to about 100:1.

3. A deodorizing composition comprising water soluble compounds of ferrous iron and cupric copper in a ratio of from about 1000:1 to about 1:10 of metallic iron content to metallic copper content, from about 10 to about 90% of each of said compounds being ionizable and the remainder of each of said compounds being non-ionizable chelates.

4. A composition according to claim 3 in which said non-ionizable compounds are gluconates.

5. A method of treating organic material susceptible to decomposition to reduce the odor thereof and to prevent the formation of decomposition odors, which comprises incorporating with said organic material in amounts ranging from about 1 to about 100 parts per million, a composition comprising ferrous iron and cupric copper in a ratio ranging from about 100:1 to about 1:1, said metals being each present in said composition in the form of water soluble compounds, from about 10 to about 90 percent of each of said compounds being ionizable and the remainder of each being non-ionizable chelates.

References Cited in the file of this patent

UNITED STATES PATENTS

| | | |
|---|---|---|
| 2,960,406 | Cardon | Nov. 15, 1960 |
| 2,791,590 | Rapp | May 7, 1957 |
| 2,895,830 | Roe | July 21, 1959 |
| 2,926,085 | Geerlings | Feb. 23, 1960 |

OTHER REFERENCES

Eddy: Chlorophyll, 1953, American Chlorophyll Division, Strong, Cobb & Co., Inc., Lake Worth, Florida, pages 34, 38, 41 and 45.

Chem. Abst. 46 (1952), 9268a. (Copy in Scientific Library.)